(12) United States Patent
DiMascio et al.

(10) Patent No.: US 10,850,999 B2
(45) Date of Patent: Dec. 1, 2020

(54) SUBMERGIBLE BIOCIDE REACTOR AND METHOD

(71) Applicant: Ecolab USA Inc., St. Paul, MN (US)

(72) Inventors: Felice DiMascio, Simsbury, CT (US); David Wells, Pittsburgh, PA (US); Mark Pokos, Pittsburgh, PA (US)

(73) Assignee: Ecolab USA Inc., St. Paul, MN (US)

( * ) Notice: Subject to any disclaimer, the term of this patent is extended or adjusted under 35 U.S.C. 154(b) by 470 days.

(21) Appl. No.: 15/135,036

(22) Filed: Apr. 21, 2016

(65) Prior Publication Data

US 2016/0311708 A1    Oct. 27, 2016

Related U.S. Application Data

(60) Provisional application No. 62/152,342, filed on Apr. 24, 2015.

(51) Int. Cl.
| | |
|---|---|
| *B01J 19/02* | (2006.01) |
| *B01J 19/30* | (2006.01) |
| *C02F 1/00* | (2006.01) |
| *C02F 1/68* | (2006.01) |
| *C02F 1/72* | (2006.01) |

(Continued)

(52) U.S. Cl.
CPC .............. *C02F 1/76* (2013.01); *B01J 19/02* (2013.01); *B01J 19/30* (2013.01); *B01J 19/305* (2013.01); *C02F 1/004* (2013.01); *C02F 1/686* (2013.01); *C02F 1/72* (2013.01); *C02F 1/766* (2013.01); *C02F 2103/023* (2013.01); *C02F 2303/04* (2013.01)

(58) Field of Classification Search
CPC . B01J 19/02; B01J 19/30; B01J 19/305; B01J 4/00; B01J 8/00; C02F 1/004; C02F 1/686; C02F 1/76; C02F 1/766; C02F 2103/023; C02F 2303/04; C02F 1/72; C01B 11/02
See application file for complete search history.

(56) References Cited

U.S. PATENT DOCUMENTS

| 4,013,761 A * | 3/1977 | Ward ..................... C02F 1/76 |
| | | 137/3 |
| 4,250,144 A | 2/1981 | Ratigan |

(Continued)

FOREIGN PATENT DOCUMENTS

| AU | 2010200677 A1 | 3/2010 |
| CA | 2539987 A1 | 9/2005 |

(Continued)

OTHER PUBLICATIONS

D.S. Miller, "Internal Flow Systems: Second Edition" BHRA (Information Services), (1978), pp. 87-92, 304-327 (Year: 1978).*

(Continued)

*Primary Examiner* — Lucas A Stelling
(74) *Attorney, Agent, or Firm* — Leydig, Voit & Mayer, Ltd.

(57) ABSTRACT

Methods of administering biocide to industrial water in an industrial water process are provided. The methods may be carried out using a reactor for generating an oxidative biocide and delivering the oxidative biocide to a liquid stream. The reactor includes, among other things, a reaction chamber and packing positioned within the reaction chamber to facilitate mixing of at least two reactants.

19 Claims, 2 Drawing Sheets

(51) Int. Cl.
*C02F 1/76* (2006.01)
*C02F 103/02* (2006.01)

(56) References Cited

U.S. PATENT DOCUMENTS

| | | | |
|---|---|---|---|
| 4,839,152 A * | 6/1989 | Vella | C01B 11/025 |
| | | | 423/478 |
| 4,886,653 A * | 12/1989 | Gasper | C01B 11/025 |
| | | | 423/478 |
| 5,419,816 A | 5/1995 | Sampson et al. | |
| 5,424,032 A | 6/1995 | Christensen et al. | |
| 6,007,726 A | 12/1999 | Yang et al. | |
| 6,080,323 A | 6/2000 | Yu et al. | |
| 6,096,225 A | 8/2000 | Yang et al. | |
| 6,423,267 B1 | 7/2002 | Yang et al. | |
| 6,440,327 B1 | 8/2002 | Shevchenko et al. | |
| 6,699,684 B2 | 3/2004 | Ho et al. | |
| 7,452,511 B2 | 11/2008 | Schmitz et al. | |
| 7,488,457 B2 | 2/2009 | DiMascio | |
| 2002/0125196 A1* | 9/2002 | Rosenblatt | C02F 1/76 |
| | | | 210/721 |
| 2003/0221971 A1 | 12/2003 | Keister | |
| 2005/0252786 A1 | 11/2005 | DiMascio | |
| 2006/0056271 A1 | 3/2006 | Kapila et al. | |
| 2006/0065064 A1* | 3/2006 | Richard | B01J 19/30 |
| | | | 73/865.5 |
| 2006/0154978 A1 | 7/2006 | Barak | |
| 2006/0280673 A1 | 12/2006 | DiMascio | |
| 2007/0049642 A1 | 3/2007 | Singleton et al. | |
| 2008/0025144 A1 | 1/2008 | Kocienski et al. | |
| 2008/0156740 A1 | 7/2008 | Gupta et al. | |
| 2008/0160604 A1 | 7/2008 | Gupta et al. | |
| 2009/0214672 A1 | 8/2009 | Ramesh et al. | |
| 2009/0311164 A1 | 12/2009 | Gupta et al. | |
| 2012/0021062 A1 | 1/2012 | Gupta et al. | |
| 2012/0165407 A1 | 6/2012 | Gupta et al. | |
| 2012/0263799 A1 | 10/2012 | Jorge | |
| 2012/0322873 A1 | 12/2012 | Atkins et al. | |
| 2013/0087504 A1* | 4/2013 | Kolstad | C02F 1/32 |
| | | | 210/695 |
| 2013/0209349 A1* | 8/2013 | Vilhelmsson | B01J 19/32 |
| | | | 423/478 |
| 2013/0280148 A1* | 10/2013 | Castillo-Welter | B01J 19/305 |
| | | | 422/652 |
| 2014/0021141 A1 | 1/2014 | Grund et al. | |
| 2014/0138325 A1 | 5/2014 | Tomsheck | |
| 2014/0183140 A1 | 7/2014 | Atkins et al. | |
| 2014/0302176 A1 | 10/2014 | Grund et al. | |
| 2016/0029639 A1 | 2/2016 | DiMascio et al. | |

FOREIGN PATENT DOCUMENTS

| | | |
|---|---|---|
| CN | 101072631 A | 11/2007 |
| CN | 101811671 A | 8/2010 |
| CN | 102958828 A | 3/2013 |
| CN | 204400608 U | 6/2015 |
| JP | 2004-35482 A | 2/2004 |
| JP | 2004-267896 A | 9/2004 |
| RU | 2522609 C2 | 7/2014 |
| WO | WO 2004/026770 A1 | 4/2004 |
| WO | WO 2014/155147 A2 | 10/2014 |

OTHER PUBLICATIONS

Butterfield et al., "Chlorination of model drinking water biofilm: implications for growth and organic carbon removal," *Water Research*, 36, Mar. 19, 2002, pp. 4391-4405.

Demadis et al., "Degradation of Phosphonate-Based Scale Inhibitor Additives in the Presence of Oxidizing Biocides: 'Collateral Damages' in Industrial Water Systems," *Separation Science and Technology*, 42, Dec. 11, 2007, pp. 1639-1649.

Mascia et al., "Fixed bed reactors with three dimensional electrodes for electrochemical treatment of waters for disinfection," *Chemical Engineering Journal*, 211-212, Oct. 2, 2012, pp. 479-487.

Israel Patent Office, International Search Report in International Patent Application No. PCT/US2016/028778, dated Jul. 24, 2016, 4 pp.

Israel Patent Office, Written Opinion in International Patent Application No. PCT/US2016/028778, dated Jul. 24, 2016, 8 pp.

Intellectual Property Office of Singapore, Written Opinion and Search Report in Singapore Patent Application No. 11201708654Q, 11 pp. (dated Sep. 12, 2018).

European Patent Office, Extended European Search Report in European Patent Application No. 16783910.9, 9 pp. (dated Sep. 4, 2018).

China National Intellectual Property Administration, Search Report in Chinese Patent Application No. 201680008110.X, 3 pp. (dated Apr. 22, 2020).

* cited by examiner

SUBMERGIBLE BIOCIDE REACTOR AND METHOD

CROSS-REFERENCE TO RELATED APPLICATIONS

This application claims the benefit of U.S. Provisional Patent Application No. 62/152,342, filed Apr. 24, 2015, the disclosure of which is incorporated by reference herein in its entirety for all purposes.

BACKGROUND

Biocides can be used to control, reduce, and/or eliminate microbial growth that may occur on inner surfaces of industrial water systems. For example, inner surfaces of cooling water systems may become fouled with scale, which can provide a medium for microbial growth and lead to ineffective performance of the cooling water system. Control, reduction, and/or elimination of microbial growth can be important for efficient operation of industrial water systems.

SUMMARY

A method of administering biocide to industrial water in an industrial water process is provided. The method comprises diverting a portion of industrial water to a side stream at a water level. The industrial water side stream is filtered. A first reactant and a second reactant are added to a biocide-forming reactor at a ratio sufficient to form biocide. The biocide-forming reactor is located at least partially below the industrial water level. The filtered industrial water side stream is treated with biocide from the biocide-forming reactor. The biocide-treated industrial water side stream is returned to the industrial water in the industrial water process.

A reactor for generating an oxidative biocide and delivering the oxidative biocide to a liquid stream is provided. The reactor comprises a body, a reaction chamber, a first inlet port for receiving a first biocide reactant, a second inlet port for receiving a second biocide reactant, and an outlet port in fluid communication with the reaction chamber. Each of the inlet ports is in fluid communication with the reaction chamber. Packing is positioned within the reaction chamber to facilitate mixing of the first and second reactants.

DETAILED DESCRIPTION

Reactors for generating an oxidative biocide and delivering the oxidative biocide to a liquid stream are provided. In preferred embodiments, an inventive reactor as provided herein is utilized to perform one or more of the inventive methods, also provided herein.

Figure 1:
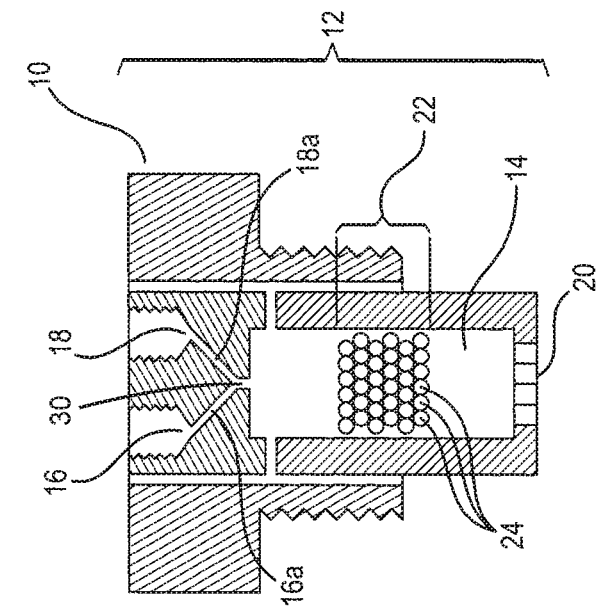
FIG. 1 illustrates an embodiment of a reactor.
Figure 2:
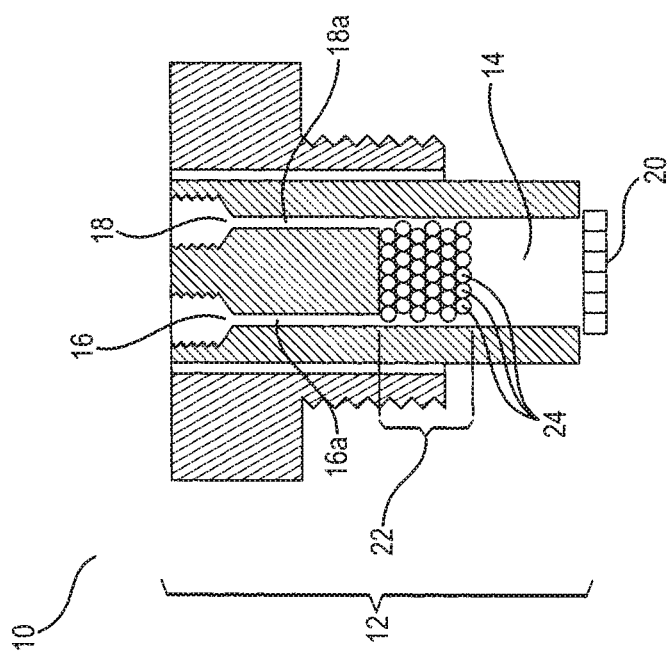
FIG. 2 illustrates an alternate embodiment of a reactor.

In each of the embodiments illustrated in FIGS. 1 and 2, reactor 10 comprises body 12. The body forms the primary structure of the reactor and forms reaction chamber 14. Each of first inlet port 16 for receiving a first biocide reactant and second inlet port 18 for receiving a second biocide reactant are in fluid communication with reaction chamber 14. The inlet ports allow reactants to enter the reaction chamber. Reaction chamber 14 is in fluid communication with outlet port 20. When the reactor is placed into service, outlet port 20 is in fluid communication with a conduit being utilized to transport a filtered side stream of an industrial water process (see, e.g., FIG. 3).

In preferred embodiments, the reaction chamber of the body of the reactor comprises packing 22. A sample portion of packing 22 is shown in the figures. However, packing 22 may substantially fill reaction chamber 14, leaving essentially only void space in the reaction chamber. When present, the packing is positioned within the reaction chamber to facilitate mixing of the first and second reactants. The packing generally includes an amount of occupied space and an amount of void space. The term "void space" is not intended to mean space devoid of matter. Typically, the void space will be occupied by fluid matter, e.g., gaseous matter, reactants (i.e., actives), and/or inert liquid(s). In a preferred embodiment, the packing occupies from about 25 percent to about 75 percent of the volume of the reaction chamber. Conversely, in the preferred embodiment, the void space of the reaction chamber occupies from about 75 percent to about 25 percent of the volume of the reaction chamber. In a further preferred embodiment, the packing occupies from about 50 percent to about 75 percent of the volume of the reaction chamber, and conversely, the void space of the reaction chamber occupies from about 50 percent to about 25 percent of the volume of the reaction chamber.

In certain embodiments, the packing of the reaction chamber is formed by a fixed packing insert. In some embodiments, the fixed packing insert is fixably attached to the body, which in certain embodiments is molded with the body as a single structure.

In a preferred embodiment, the packing of the reaction chamber is formed by a plurality of packing members 24. The packing members may comprise random packing. For example, the packing members may be selected from the group consisting of: glass balls, ceramic balls, Raschig rings, Berl saddles, and combinations thereof. In embodiments that comprise a plurality of packing members, the reaction chamber is configured to prevent the packing members from leaving the reaction chamber. For example, in certain embodiments, the inlet ports and/or the outlet port may comprise one or more openings that are smaller in cross-sectional area than the cross-section of each packing member. Alternately or in combination, the reactor may be arranged so that any opening having a larger cross-sectional area faces upward, thereby allowing gravity to act on the packing members.

In certain embodiments, the reaction chamber defines a first diameter and each packing member defines a second diameter. In certain embodiments, the ratio of the first diameter to the second diameter is from about 3:1 to about 8:1. In a preferred embodiment, the ratio of the first diameter to the second diameter is from about 4:1 to about 6:1.

In certain embodiments, the body of the reactor is formed from a halogenated plastic. Examples of halogenated plastics include, but are not limited to, polyvinyl chloride ("PVC"), chlorinated polyvinyl chloride ("CPVC"), chlorinated polyethylene, chlorosulfonated polyethylene, polychloroprene, polyvinylidene fluoride ("PVDF"), fluorinated ethylene propylene ("FEP"), and combinations thereof.

In certain embodiments, each of the first inlet port and the second inlet port are in fluid communication with the reaction chamber via respective inlet channels 16a and 18a.

For certain combinations of biocide reactants, it is preferred to keep the first and second biocide reactants separated until each has entered the reaction chamber. For the circumstance described, utilization of a reactor having inlet channels that are arranged to deliver each of the first reactant and the second reactant into the reaction chamber via separate streams may be desired, such as the embodiment shown in FIG. 1.

However, for certain other combinations of reactants, it is preferable to mix the reactants as soon as reasonably possible in the reactor. Thus, in certain embodiments, the inlet channels 16a and 18a are arranged to deliver the first reactant and the second reactant into the reaction chamber via single stream 30. The single-stream configuration allows for the reactants to begin mixing with each other prior to entering the reaction chamber, which is believed to facilitate more uniform mixing within the reaction chamber.

In certain embodiments, the body of the reactor can be made from one or more pipe fittings constructed of materials suitable for contacting the biocide, the industrial water side stream, and/or the reactants. In certain embodiments, the body of the reactor is constructed of, e.g., a halogenated plastic (e.g., chlorinated polyvinyl chloride ("CPVC")) bushing equipped with a plug constructed of, e.g., a halogenated plastic (e.g., CPVC). Appropriate holes and connector adaptations should be made to accommodate any necessary connector fittings. In a preferred embodiment, the body is molded as a one-piece, two-piece, or three-piece, or n-piece structure. For the two-, three-, or n-piece structures, the body can be assembled using the two, three, or n pieces by a person of skill in the art without undue experimentation. Preferably, the reactor is assembled as shown in the figures provided. Preferably, the reactor is used to perform the methods disclosed herein.

Methods of administering biocide to industrial water in an industrial water process are also provided. Generally, the methods involve administering oxidative biocide to industrial water in an industrial water process.

Figure 3:
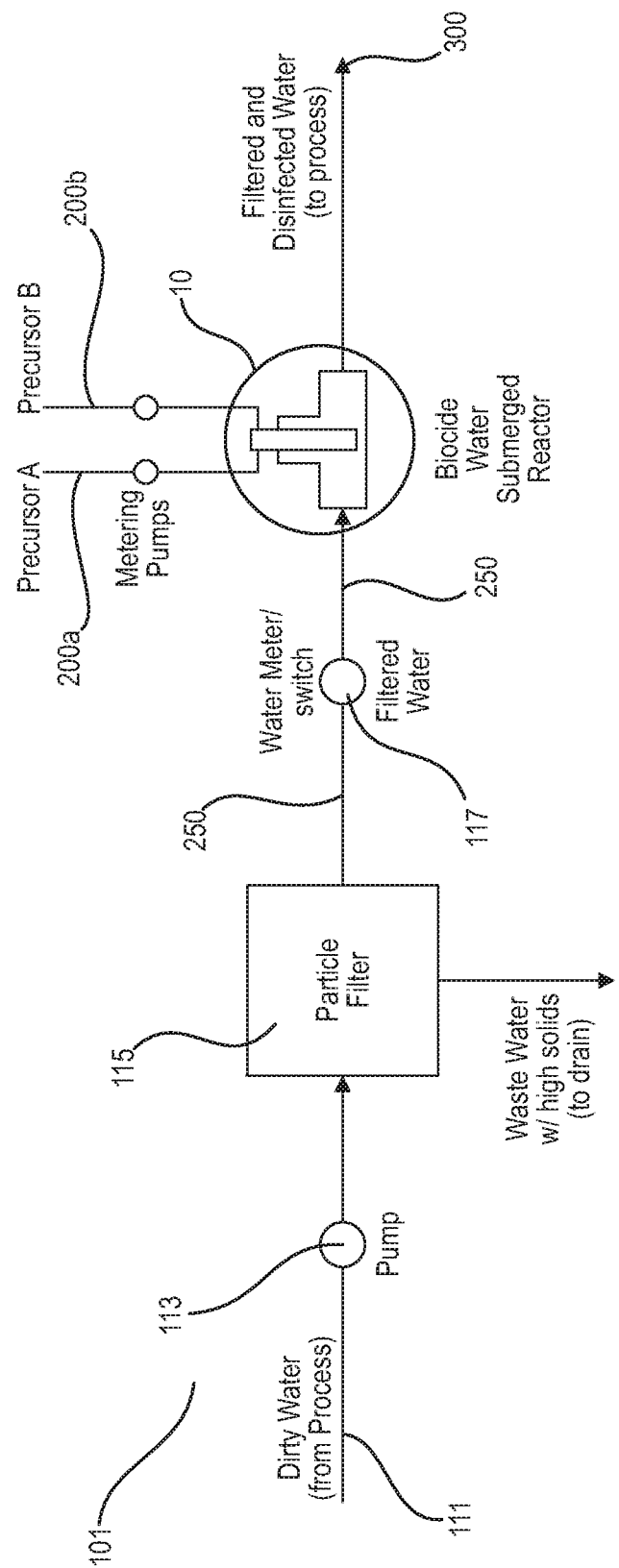
FIG. 3 illustrates a flow chart of a system that can be utilized to carry out the methods disclosed herein.

The method comprises diverting a portion of industrial water to a side stream at a water level. FIG. 3 illustrates an embodiment of system 101 that can be utilized for carrying out the methods disclosed herein. In the embodiment of FIG. 3, side stream 111 generally flows at a flow rate that allows the industrial water process to filter an equal volume of water as contained in the industrial water process in a time period of about one day to about one hour. For example, an industrial water process that contains about 400 gallons may operate a side stream at a flow rate of from about 400 gallons per day to about 400 gallons per hour, or an industrial water process that contains about 40,000 gallons may operate a side stream at a flow rate of from about 40,000 gallons per day to about 40,000 gallons per hour.

As illustrated in FIG. 3, industrial water side stream 111 is delivered via pump 113 to filter 115. The filtration removes a quantity of solids, which may include microorganisms, from the industrial water side stream, even in the absence of biocide in the industrial water side stream. The removal of solids from the industrial water side stream lessens the overall oxygen demand of the industrial water process, and particularly of the industrial water side stream, which reduces the amount of biocide necessary to provide adequate microbiological control as compared to a non-filtered industrial water side stream. As it relates to this disclosure, "adequate microbiological control" is used to describe, for example, a biocide treatment method where the number of microorganisms is reduced by orders of magnitude within a certain time period, or in the situation where microbiological counts are maintained less than 1,000 CFU/mL, which was done for each example listed herein. For example, a biocide treatment method that kills 99.9% of microorganisms (e.g., colony-forming units, or "CFU") within a 72-hour period (i.e., 3-log kill) may be considered adequate microbiological control.

In certain embodiments, the filtering is carried out via at least one of a single-pass cyclone, a sieve, and a centrifugal action vortex separator. In certain embodiments, suspended solids having an average particle size of from about 1 micron to about 50 microns that are present in the industrial water side stream are removed via the filtering, including from about 1 micron to about 25 microns, or from about 1 micron to about 10 microns. In certain embodiments, the filtration is carried out via a multi-stage filtration unit.

The embodiment of FIG. 3 includes optional water meter/switch 117. A first reactant 200a and a second reactant 200b are added to a biocide-forming reactor 10 at a ratio sufficient to form biocide. The reactor is located at least partially below the industrial water level. It is important to conduct the reaction below the water level of the filtered industrial water side stream in order to cool the reactor. Many of the reactions that may occur inside the reaction chamber are exothermic reactions. Locating the reactor at least partially below the industrial water level allows the reactor, and subsequently the reaction, to be cooled by the industrial water, e.g., the filtered industrial water side stream.

For example, in certain embodiments, sulfuric acid is reacted with sodium chlorite to form chlorine dioxide, which is an exothermic reaction. High temperature tends to degrade chlorine dioxide. Therefore, the cooling provided by the filtered industrial water side stream reduces the degradation and allows for better reaction efficiency.

In the embodiment of FIG. 3, filtered industrial water side stream 250 is treated with biocide from the biocide-forming reactor. In certain embodiments, the biocide treating the filtered industrial water side stream provides a biocide concentration of from about 0.1 milligram to about 25 milligrams per liter of filtered industrial water. In a preferred embodiment, the biocide treating the filtered industrial water side stream provides a biocide concentration of from about 0.1 ppm to about 10 ppm, or from about 0.1 ppm to about 5 ppm.

In the embodiment of FIG. 3, biocide-treated industrial water side stream 300 is returned to the industrial water in the industrial water process. The filtration removes solid materials prior to addition of the biocide, which includes some microbial matter. Removal of solids from the industrial water, e.g., the industrial water side stream, reduces the oxidant demand, which allows the biocide to persist at a higher residual concentration when returned to the industrial water process.

In certain embodiments, the first reactant is a halogen-containing salt. For purposes of this disclosure, examples of halogen-containing salts include, but are not limited to, chloride salts, fluoride salts, bromide salts, iodide salts, chlorite salts, and combinations thereof. The corresponding cation of the halogen-containing salt may be, for example, sodium, potassium, ammonium, and combinations thereof.

In certain embodiments, the second reactant is a chlorine-containing acid or salt thereof. For purposes of this disclosure, examples of chlorine-containing acids include, but are not limited to, hydrochloric acid and hypochlorous acid.

In certain embodiments, the first reactant is a chlorite salt and the second reactant is hydrochloric acid. The chlorite salt may be added as an aqueous solution at a concentration of from about 10 weight percent to about 40 weight percent.

In a preferred embodiment, the chlorite salt is an alkali chlorite, e.g., sodium chlorite, potassium chlorite, or combinations thereof. The hydrochloric acid may be added as an aqueous solution at a concentration of from about 10 weight percent to about 36 weight percent.

In certain embodiments, the first reactant is a fluoride salt and the second reactant is a hypochlorous acid or salt. The fluoride salt may be added as an aqueous solution at a concentration of from about 1 weight percent to about 4 weight percent. In a preferred embodiment, the fluoride salt is an alkali fluoride, e.g., sodium fluoride, potassium fluoride, or combinations thereof. The hypochlorous acid may be added as an aqueous solution at a concentration of from about 5 weight percent to about 20 weight percent.

In certain embodiments, the first reactant is a bromide salt and the second reactant is a hypochlorous acid or salt. The bromide salt may be added as an aqueous solution at a concentration of from about 10 weight percent to about 90 weight percent. In a preferred embodiment, the bromide salt is an alkali bromide, e.g., sodium bromide, potassium bromide, or combinations thereof. The hypochlorous acid may be added as an aqueous solution at a concentration of from about 5 weight percent to about 20 weight percent.

In certain embodiments, the first reactant is an iodide salt and the second reactant is a hypochlorous acid or salt. The iodide salt may be added as an aqueous solution at a concentration of from about 10 weight percent to about 30 weight percent. In a preferred embodiment, the iodide salt is an alkali iodide, e.g., sodium iodide, potassium iodide, or combinations thereof. The hypochlorous acid may be added as an aqueous solution at a concentration of from about 5 weight percent to about 20 weight percent.

In certain embodiments, the first reactant is an ammonium salt and the second reactant is a hypochlorous acid or salt. The ammonium salt may be added as an aqueous solution at a concentration of from about 10 weight percent to about 30 weight percent. In a preferred embodiment, the ammonium salt is an ammonium halide and/or ammonium sulfate, e.g., ammonium chloride, ammonium bromide, ammonium iodide, ammonium sulfate, or combinations thereof. The hypochlorous acid may be added as an aqueous solution at a concentration of from about 5 weight percent to about 20 weight percent.

In certain embodiments, the biocide comprises a reaction product selected from the group consisting of: chlorine dioxide, fluorine, chlorine, bromine, iodine, chloramine, and combinations thereof.

In certain embodiments, the method is performed such that the method has a flow-residence factor of from about 0.00001 to about 0.1, including from about 0.0001 to about 0.01, or to about 0.001. The flow-residence factor (FRF) is calculated by dividing the sum total volumetric flow rate of reactants ($\Sigma RVF$) by the volumetric flow rate of the industrial water side stream (SS), each having like units, and then multiplying the quotient by the total industrial water in the industrial water system (VOL), and dividing by the volumetric void space of the reaction chamber (VVS), in like units, leaving a unitless FRF. Formula 1 demonstrates calculation of the flow-residence factor.

$$FRF = (VVS/\Sigma RVF) * (SS/VOL) \quad \text{Formula 1}$$

In a preferred embodiment, the method has a flow-residence factor of from about 0.0001 to about 0.001.

The industrial water system may include a basin (i.e., a sump), which may contain a relatively large amount of the industrial water of the industrial water system. In certain embodiments, the side stream is drawn from the basin. In certain embodiments, the side stream is returned to the basin. The industrial water system may include a condenser circulation line. For such embodiments, the side stream may be drawn from and/or returned to the condenser circulation line. In certain embodiments, side streams may be drawn from and/or returned to both the basin and the condenser circulation line.

For the Examples below, which are not to be limiting, the reaction chamber of the biocide-generating reactor had a diameter of 1.25 in. and a length of 1.5 in. The reaction chamber was filled with 6- to 8-mm glass balls that occupied ⅔ of the volume of the reaction chamber, leaving ⅓ of the reaction chamber volume as volumetric void space. The calculated void volume space for the reactor of the Examples is 0.6136 cubic inches, or 0.0026563 gallons.

Example 1

A side stream is removed from and returned to a basin of an aqueous cooling system (an example of an industrial water system). The aqueous cooling system contains about 40,000 gallons of industrial water that is recirculated at 5,000 gallons per minute. The side stream is circulated at 60 gallons per minute, which will result in a turnover time of about 13 hours. The side stream is filtered using a multi-stage cylindrical filter comprising a coarse screen followed by a woven stainless steel wire mesh. The coarse screen includes 9 mm diameter holes, and the mesh includes passages of from about 5 to about 10 microns. After filtration, a resulting dose of 1.4 ppm chlorine dioxide is delivered to the side stream (i.e., 1 lb/day of chlorine dioxide). In order to achieve the resulting dose, 0.67 gallons per day of 25 wt % aqueous sodium chlorite solution and 0.61 gallons per day of 32 wt % aqueous hydrochloric acid solution is delivered to the biocide-forming reactor, which is located at least partially below the industrial water level. The resulting FRF for this Example is approximately 0.00448, resulting in adequate microbiological control.

Example 2

A side stream is removed from and returned to a basin of an aqueous cooling system (an example of an industrial water system). The aqueous cooling system contains about 40,000 gallons of industrial water that is recirculated at 5,000 gallons per minute. The side stream is circulated at 60 gallons per minute, which will result in a turnover time of about 13 hours. The side stream is filtered using the filtration unit of Example 1. After filtration, a resulting dose of 4.2 ppm chlorine dioxide is delivered to the side stream (i.e., 3 lb/day of chlorine dioxide). In order to achieve the resulting dose, 2.01 gallons per day of 25 wt % aqueous sodium chlorite solution and 1.83 gallons per day of 32 wt % aqueous hydrochloric acid solution is delivered to the biocide-forming reactor, which is located at least partially below the industrial water level. The resulting FRF for this Example is approximately 0.00149, resulting in adequate microbiological control.

Example 3

A side stream is removed from and returned to a basin of an aqueous cooling system (an example of an industrial water system). The aqueous cooling system contains about 40,000 gallons of industrial water that is recirculated at 5,000 gallons per minute. The side stream is circulated at 60 gallons per minute, which will result in a turnover time of about 13 hours. The side stream is filtered using the filtration unit of Examples 1 and 2. After filtration, a resulting dose of 1.4 ppm bromine is delivered to the side stream (i.e., 1 lb/day of bromine). In order to achieve the resulting dose, 0.18 gallons per day of 42.8 wt % aqueous sodium bromide solution and 0.45 gallons per day of 12.5 wt % aqueous sodium hypochlorite solution is delivered to the biocide-forming reactor, which is located at least partially below the industrial water level. The resulting FRF for this Example is approximately 0.00911, resulting in adequate microbiological control.

Example 4

A side stream is removed from and returned to a basin of an aqueous cooling system (an example of an industrial water system). The aqueous cooling system contains about 40,000 gallons of industrial water that is recirculated at 5,000 gallons per minute. The side stream is circulated at 60 gallons per minute, which will result in a turnover time of about 13 hours. The side stream is filtered using the filtration unit of Examples 1-3. After filtration, a resulting dose of 1.4 ppm iodine is delivered to the side stream (i.e., 1 lb/day of iodine). In order to achieve the resulting dose, 0.6 gallons per day of 20 wt % aqueous potassium iodide solution and 0.42 gallons per day of 12.5 wt % aqueous sodium hypochlorite solution is delivered to the biocide-forming reactor, which is located at least partially below the industrial water level. The resulting FRF for this Example is approximately 0.00563, resulting in adequate microbiological control.

Example 5

A side stream is removed from and returned to a basin of an aqueous cooling system (an example of an industrial water system). The aqueous cooling system contains about 40,000 gallons of industrial water that is recirculated at 5,000 gallons per minute. The side stream is circulated at 60 gallons per minute, which will result in a turnover time of about 13 hours. The side stream is filtered using the filtration unit of Examples 1-4. After filtration, a resulting dose of 2.8 ppm chloramine is delivered to the side stream (i.e., 2 lb/day of chloramine). In order to achieve the resulting dose, 1.55 gallons per day of 20 wt % aqueous ammonium sulfate solution and 2.79 gallons per day of 12.5 wt % aqueous sodium hypochlorite solution is delivered to the biocide-forming reactor, which is located at least partially below the industrial water level. For this reaction, the aqueous sodium hypochlorite solution further comprised from about 1.5 to about 3 wt % sodium hydroxide, and the reaction product had a pH of from about 7 to about 9. The resulting FRF for this Example is approximately 0.00132, resulting in adequate microbiological control.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for treating an industrial water stream, the system comprising:
   (a) a conduit for diverting a portion of an industrial water stream into a side stream thereof,
   (b) a filter for removing solids from the industrial water side stream, and
   (c) a reactor for generating an oxidative biocide comprising
   a body comprising a reaction chamber,
   a first inlet port for receiving a first biocide reactant,
   a second inlet port for receiving a second biocide reactant,
     each of the inlet ports in fluid communication with the reaction chamber,
   an outlet port in fluid communication with both the reaction chamber and the conduit; and
   packing positioned within the reaction chamber to facilitate mixing of the first and second reactants,
   wherein
   the packing occupies from about 25 percent to about 75 percent of the volume of the reaction chamber; and
   the reactor is at least partially submerged in the portion of the industrial water side stream that is downstream from and filtered by the filter.

2. The system of claim 1, wherein the packing is formed by a plurality of packing members.

3. The system of claim 2, wherein the reaction chamber defines a first diameter and each packing member defines a second diameter, the ratio of the first diameter to the second diameter being from about 3:1 to about 8:1.

4. The system of claim 2, wherein the packing members are selected from the group consisting of: glass balls, ceramic balls, Raschig rings, Berl saddles, and combinations thereof.

5. The system of claim 2, wherein the reaction chamber defines a first diameter and each packing member defines a second diameter, the ratio of the first diameter to the second diameter being from about 4:1 to about 6:1.

6. The system of claim 1, wherein the body is formed from a halogenated plastic.

7. The system of claim 1, wherein the packing is formed by a fixed packing insert.

8. The system of claim 7, wherein the fixed packing insert is fixably attached to the body.

9. The system of claim 1, wherein each of the first inlet port and the second inlet port are in fluid communication with the reaction chamber via respective inlet channels.

10. The system of claim 9, wherein the inlet channels are arranged to deliver each of the first reactant and the second reactant into the reaction chamber via separate streams.

11. The system of claim 10, wherein the packing is formed by a plurality of packing members.

12. The system of claim 11, wherein the reaction chamber defines a first diameter and each packing member defines a second diameter, the ratio of the first diameter to the second diameter being from about 3:1 to about 8:1.

13. The system of claim 10, wherein the inlet channels are arranged parallel to each other.

14. The system of claim 9, wherein the inlet channels are arranged to deliver the first reactant and the second reactant into the reaction chamber via a single stream.

15. The system of claim 14, wherein the inlet channels merge at tapered angles to form the single stream.

16. The system of claim 15, wherein the tapered angles form a right angle at the single stream.

17. The system of claim 14, wherein the packing is formed by a plurality of packing members.

18. The system of claim 17, wherein the reaction chamber defines a first diameter and each packing member defines a second diameter, the ratio of the first diameter to the second diameter being from about 3:1 to about 8:1.

19. The system of claim 17, wherein the reaction chamber defines a first diameter and each packing member defines a second diameter, the ratio of the first diameter to the second diameter being from about 4:1 to about 6:1.

* * * * *